(12) United States Patent
Silverstein

(10) Patent No.: US 6,908,550 B2
(45) Date of Patent: Jun. 21, 2005

(54) FILTER BAG

(76) Inventor: Steven M. Silverstein, 472 N. Winnebago Dr., Lake Winnebago, MO (US) 64034-9321

(*) Notice: Subject to any disclaimer, the term of this patent is extended or adjusted under 35 U.S.C. 154(b) by 0 days.

(21) Appl. No.: 10/442,454

(22) Filed: May 21, 2003

(65) Prior Publication Data

US 2004/0232058 A1 Nov. 25, 2004

(51) Int. Cl.$^7$ .............................. E04H 4/16; B01D 29/27
(52) U.S. Cl. .................... 210/169; 210/232; 210/416.2; 210/460; 15/1.7
(58) Field of Search ................................ 210/169, 232, 210/416.1, 416.2, 448, 460; 15/1.7

(56) References Cited

U.S. PATENT DOCUMENTS

| | | | | | |
|---|---|---|---|---|---|
| 1,801,193 | A | * | 4/1931 | Darst | 55/369 |
| 1,871,024 | A | * | 8/1932 | Barber | 55/371 |
| 1,894,884 | A | * | 1/1933 | Page | 55/369 |
| 1,930,659 | A | * | 10/1933 | Purdy | 55/369 |
| 2,693,246 | A | * | 11/1954 | Marcheck | 55/482 |
| 3,421,302 | A | * | 1/1969 | Dahl | 56/202 |
| 3,426,510 | A | * | 2/1969 | Schaaf | 55/368 |
| 3,535,855 | A | * | 10/1970 | Schaaf et al. | 55/368 |
| 4,022,695 | A | * | 5/1977 | Howard et al. | 210/486 |
| 4,572,724 | A | * | 2/1986 | Rosenberg et al. | 96/6 |
| 4,618,420 | A | | 10/1986 | Alanis | 210/169 |
| D288,373 | S | | 2/1987 | Alanis | D32/31 |
| 4,652,369 | A | * | 3/1987 | DePolo et al. | 210/169 |
| 4,801,376 | A | * | 1/1989 | Kulitz | 210/123 |
| 4,808,237 | A | * | 2/1989 | McCormick et al. | 134/26 |
| 4,880,531 | A | | 11/1989 | Blake et al. | 210/169 |
| 4,932,987 | A | * | 6/1990 | Molina | 96/212 |
| 5,084,174 | A | * | 1/1992 | Perala et al. | 210/331 |
| 5,092,682 | A | | 3/1992 | Fenick | 383/22 |
| 5,133,854 | A | * | 7/1992 | Horvath | 210/121 |
| 5,362,406 | A | * | 11/1994 | Gsell et al. | 210/767 |
| 5,454,940 | A | | 10/1995 | Lakotish | 210/169 |
| D379,693 | S | | 6/1997 | Campbell et al. | 32/30 |
| 5,647,982 | A | * | 7/1997 | Haythornthwaite | 210/346 |
| D387,521 | S | | 12/1997 | Bitner et al. | D32/30 |
| 5,746,514 | A | | 5/1998 | Orensten | 383/66 |
| 5,863,425 | A | | 1/1999 | Herlehy et al. | 210/169 |
| 5,948,249 | A | * | 9/1999 | Scott | 210/232 |
| 6,193,885 | B1 | | 2/2001 | Campbell | 210/242.1 |
| 6,206,447 | B1 | * | 3/2001 | Nation | 296/77.1 |
| 6,241,899 | B1 | | 6/2001 | Ramos | 210/767 |
| 6,267,506 | B1 | | 7/2001 | Campion | 383/59 |
| 6,478,464 | B1 | | 11/2002 | Miller | 383/76 |

FOREIGN PATENT DOCUMENTS

JP          8-215514     *  8/1996

* cited by examiner

Primary Examiner—Fred G. Prince
(74) Attorney, Agent, or Firm—Polsinelli Shalton Welte Suelthaus PC

(57) ABSTRACT

A filter bag for a pool cleaning device includes a bag structure, formed of nylon mesh material, and a discharge opening, formed by a zipper. The zipper allows for temporary access to the interior chamber of the bag by opening the zipper.

18 Claims, 4 Drawing Sheets

FILTER BAG

TECHNICAL FIELD

The present invention relates to a filter bag for use with any of a variety of pool cleaning devices. In particular, this invention relates to a filter bag having a lasting and durable fastener, such as a zipper.

BACKGROUND

Swimming pools, both residential and commercial, need to be cleaned and filtered regularly for health and aesthetic reasons. While there are pool cleaning services available for cleaning residential pools, many owners elect to clean their own pools. As such, any of a variety of different machines can be purchased for use in cleaning a residential pool. Exemplary pool-cleaning devices, with a collector or filter bag, are shown and described in U.S. Pat. Nos. 3,822,754 and 4,618,420.

Most of these machines are designed to be submerged and move randomly along the pool floor and side walls. During operation debris and sediment are collected in a bag connected to the device. With the passage of time, the debris needs to be removed from the filter bag.

Known filter bags have included a seam that can be separated to allow for the removal of debris. The seam, typically, is held together by a Velcro® fastening strip. As a result of continuous use, specifically fastening and unfastening the Velcro®, the grip strength of the Velcro® decreases. Resultingly, the fastening strips begin to separate at various points, so that debris is not held in the bag. Ultimately, the fastening strips will separate completely preventing retention of the debris. When the strips can no longer hold the seam together, a new bag must be installed. As such, it is desired to have a filter bag that has a fastening device that does not readily separate with use and the passage of time. In particular, it is desired to have a bag that does not have to be frequently replaced.

SUMMARY

The present invention improves on the contemporary art by providing a filter bag for use with a pool-cleaning device. The filter bag has a separable portion, fastened together by a sturdy, secure, and long-lasting fastener. The preferred fastener is a zipper that allows for easy opening and closing of the filter bag. Any of a variety of filter bags for use with a pool cleaner can be used so long as the fastener, disclosed herein, can be used with the selected bag. Advantageously, the zipper allows the bag to be easily emptied of its contents. The zipper provides a secure closure, that will not degrade over time, keeping the captured debris and sediment in the bag.

An embodiment of the invention is directed to a filter bag having a plurality of sidewalls, more particularly, at least two. The sidewalls are oriented with respect to each other to define a plurality of sides, with the sides proximal to the edges of the sidewalls. Included is a first open side and at least one second side. The second side includes at least one zipper along at least a portion of the second side. The zipper makes this portion of the second side releasably separable. The releasably separable portion defines a discharge opening for the filter bag. The remainder of the second side, not including the zipper, is such that the sidewalls are interconnected.

Another embodiment is directed to a filter bag having a plurality of sidewalls that are oriented with respect to each other to define a chamber therebetween and a plurality of sides. The plurality of sides includes a first open side and a second side. The second side includes at least one zipper along at least a portion of the second side, so that the zipper renders the second side releasably separable. The portion of the second side, including the zipper, defines at least one discharge opening for the bag. There is also a seam extending along at least a portion of the sidewalls, joining the sidewalls. The seam separates the chamber into a first water flow portion and a second material collection portion. Additionally, the portion of the second side, excluding the zipper, is such that the sidewalls are interconnected.

BRIEF DESCRIPTION OF THE DRAWINGS

Attention is now directed to the drawings, where like numerals and characters indicate like or corresponding components. In the drawings.

DETAILED DESCRIPTION OF THE DRAWINGS

Figure 1:
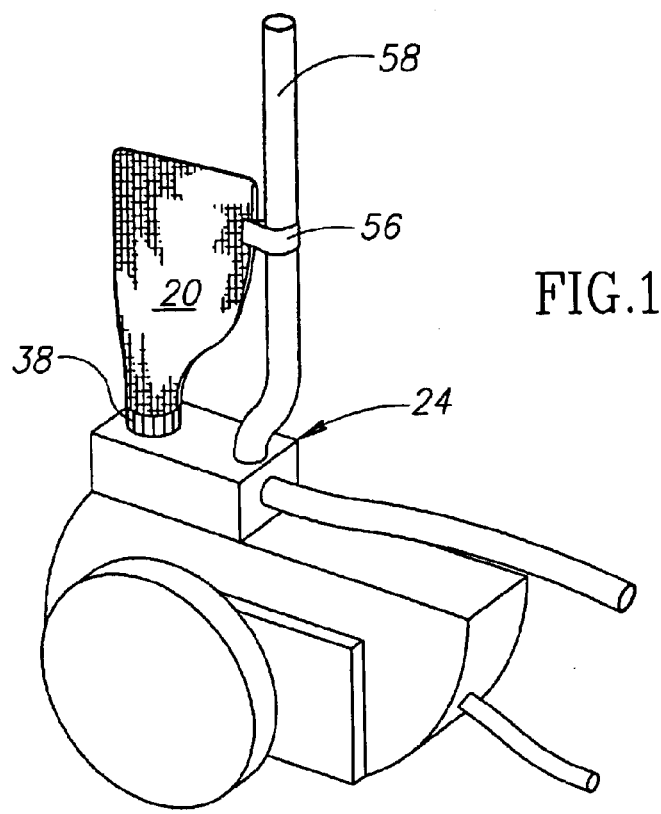
FIG. 1 is a perspective view of the bag of the present invention in use with a pool-cleaning device.

FIG. 1 shows the bag 20 of the present invention in operation on a pool cleaning machine 24. The pool cleaning machine 24 can be, for example, one of the pool cleaning devices shown and described in U.S. Pat. Nos. 3,822,754 and 4,618,240. Both of these patents are incorporated by reference herein.

Throughout this document, references are made to terms such as top, bottom, upward, downward, rear, forward, and rearward. These terms are utilized to show the filter bags 20, 20' of the invention in a typical, exemplary orientation, and are for explanation purposes only. They are not otherwise limiting.

Figure 2:
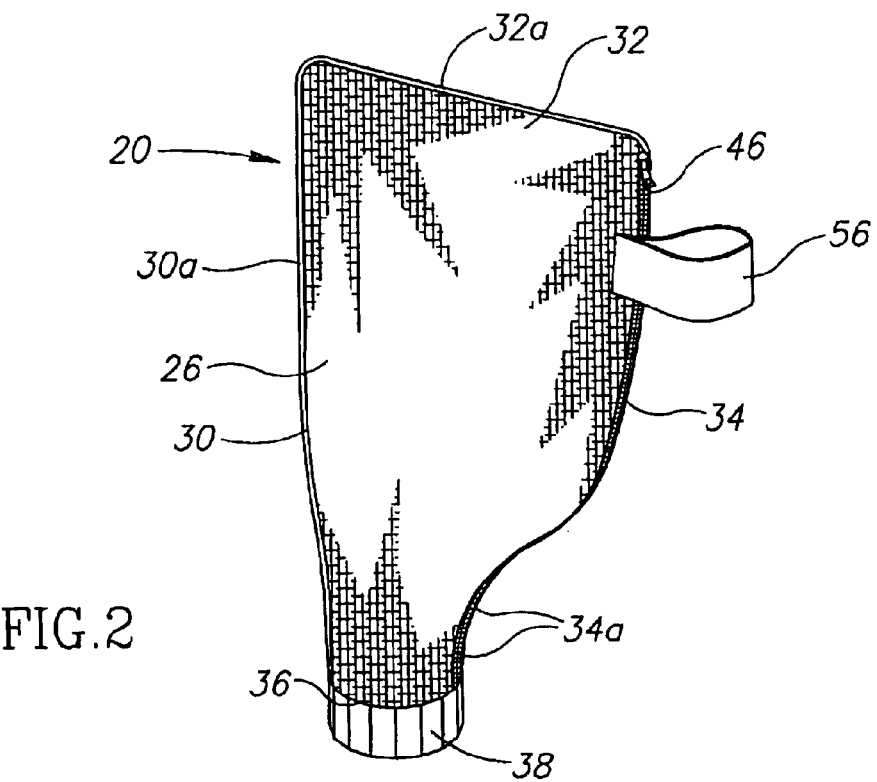
FIG. 2 is a perspective view of the bag of FIG. 1 with its discharge opening closed (in the closed position)
Figure 3:
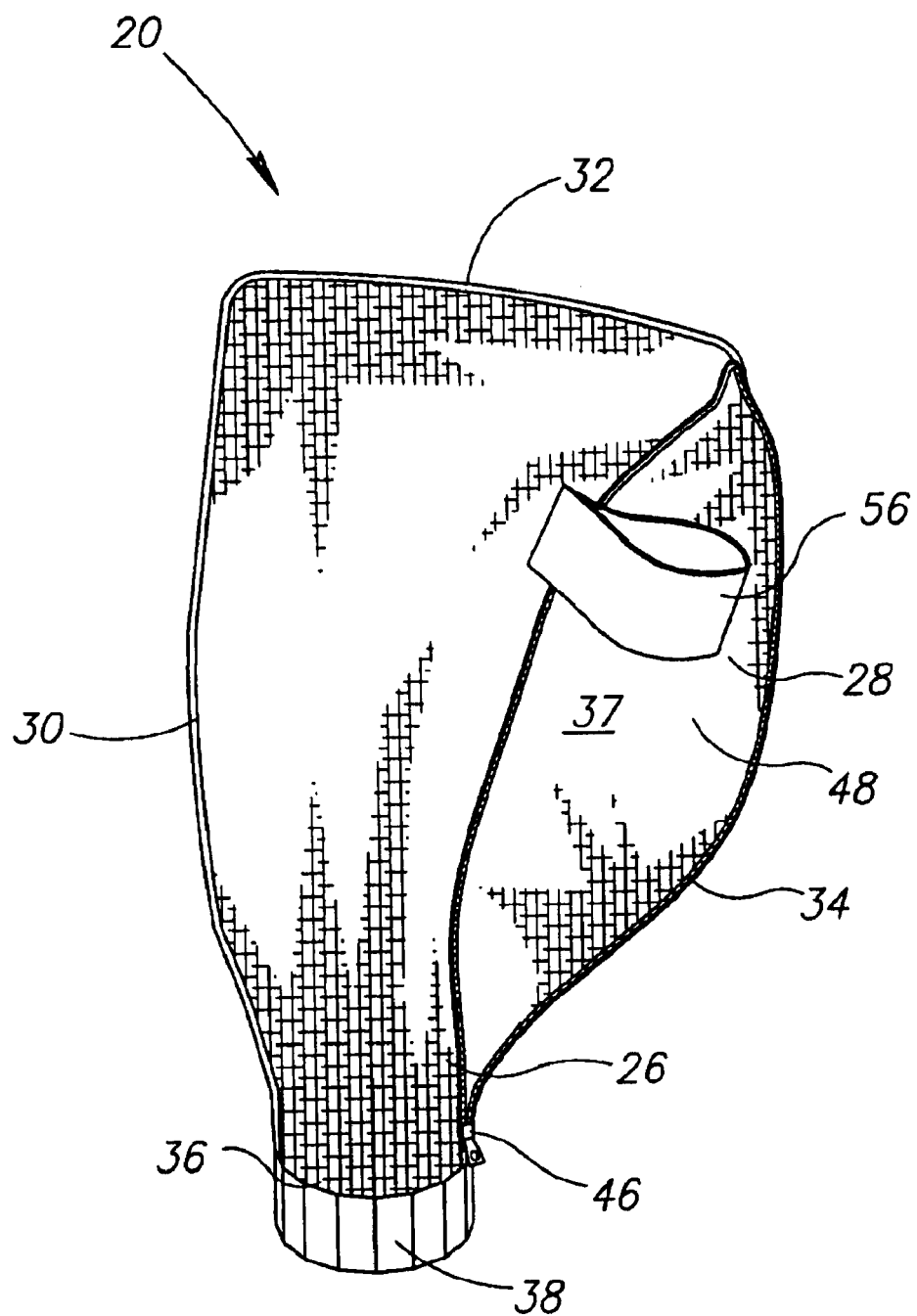
FIG. 3 is a perspective view of the bag of FIG. 1 with its discharge opening opened (in the open position)

Turning to FIGS. 2 and 3, the bag 20 can be formed from single or multiple pieces of nylon mesh fabric; however, any fabric that allows water to pass therethrough while trapping debris and sediment can be used. The fabric must be such that water will pass, but debris and sediment are trapped. The fabric is configured to include multiple, typically two, sidewalls 26, 28. The sidewalls are oriented so as to be bordered by at least two, and preferably four sides 30, 32, 34, and 36. The sides are proximal to the edges or periphery of the sidewalls 26, 28. At least one chamber 37 is formed by the sidewalls 26, 28, whereby the inner faces of the sidewalls form the chamber. Sides 30, 32, and 34 are preferably closed, while side 36, is preferably open. The open side 36 is preferably attached to a collar 38, with collar 38 designed to be attached to a bore (not shown) of a pool cleaning machine 24. A preferred example is shown by the mounting ring and suction masts of U.S. Pat. No. 4,618,420.

Preferably, the first lateral side 30, and top side 32 are seamed along their edges 30a, 32a for reinforcement. Alternately, lateral side 30 and top side 32 can be formed by folding over the fabric that forms the sidewalls 26, 28. As such, sides 30 and 32 are formed by the sidewalls 26 and 28 being fixedly attached. Lateral side 34, opposite the lateral side 30, is arranged, such that a fastener member 46 extends along at least a portion of this second lateral side 34. When the fastener member 46 does not extend along the entire second lateral side 34, the portion not having the fastener member 46 is typically seamed along edge 34a for reinforcement. A zipper is the preferred fastener member. The zipper member 46 is typically oriented upward, away from the collar 38, but a downward orientation (toward the collar 38) is also suitable. Note that a zipper is a device for fastening the adjacent edges of an opening, consisting of two facing rows of metal or plastic teeth or coils interlocked by a sliding tab.

While the fastener 46 is shown attached to the second lateral side 34, it can alternatively be located along any portion of the bag. More particularly, it can be located alternatively on sides 30 or 32. The fastener can, in the alternative, be located on all three sides, or any two of the sides in combination.

The fastener 46, extending along the second lateral side 34, defines the discharge opening 48, through which the bag 20 can be opened. When the bag 20 is opened, as shown in FIG. 3 (the zipper 46 has been moved downward), the chamber 37 is accessible and the contents can be emptied. The bag 20 can then be secured from the open position back to the closed position (FIG. 2). This occurs as the zipper 46 has been moved upward, to close the discharge opening 48 in a permanent and secure manner.

The bag 20 also includes a strip 56 that can be attached to a hose 58 of the cleaning machine 24. The strip 56 is designed to hold and stabilize the bag.

While one shape for the bag 20 is shown, the bag 20 can be of any one of numerous shapes, provided debris and sediment can be collected while allowing for the passage of water.

Figure 4:
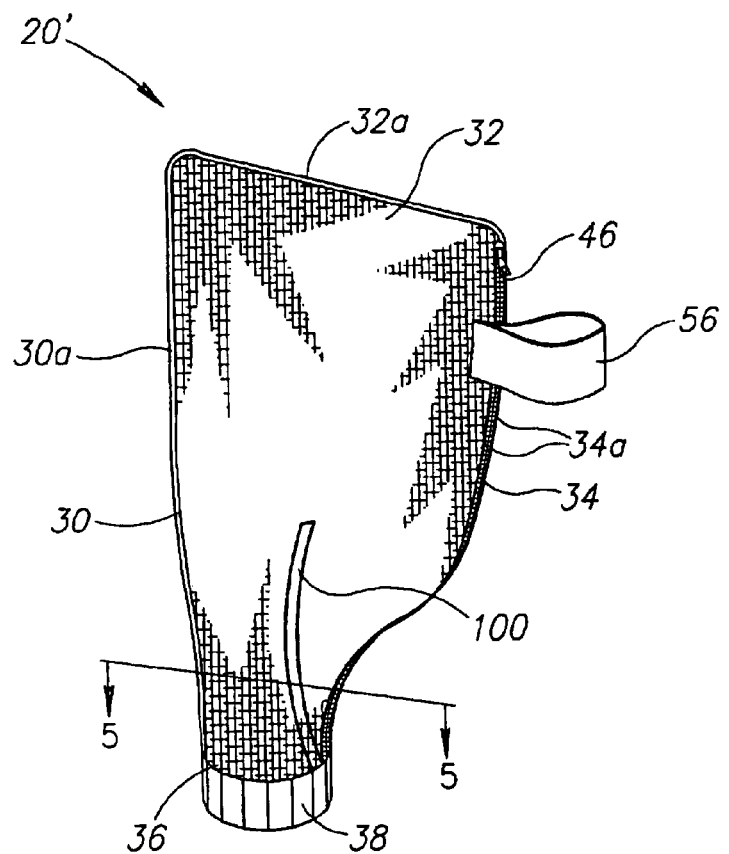
FIG. 4 is a perspective view of another embodiment of a filter bag with its discharge opening closed (in the closed position)
Figure 5:
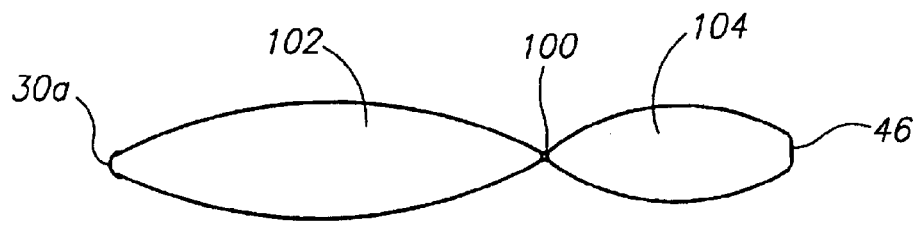
FIG. 5 is a cross-sectional view of the filter bag of FIG. 4 taken along line 5—5.
Figure 6:
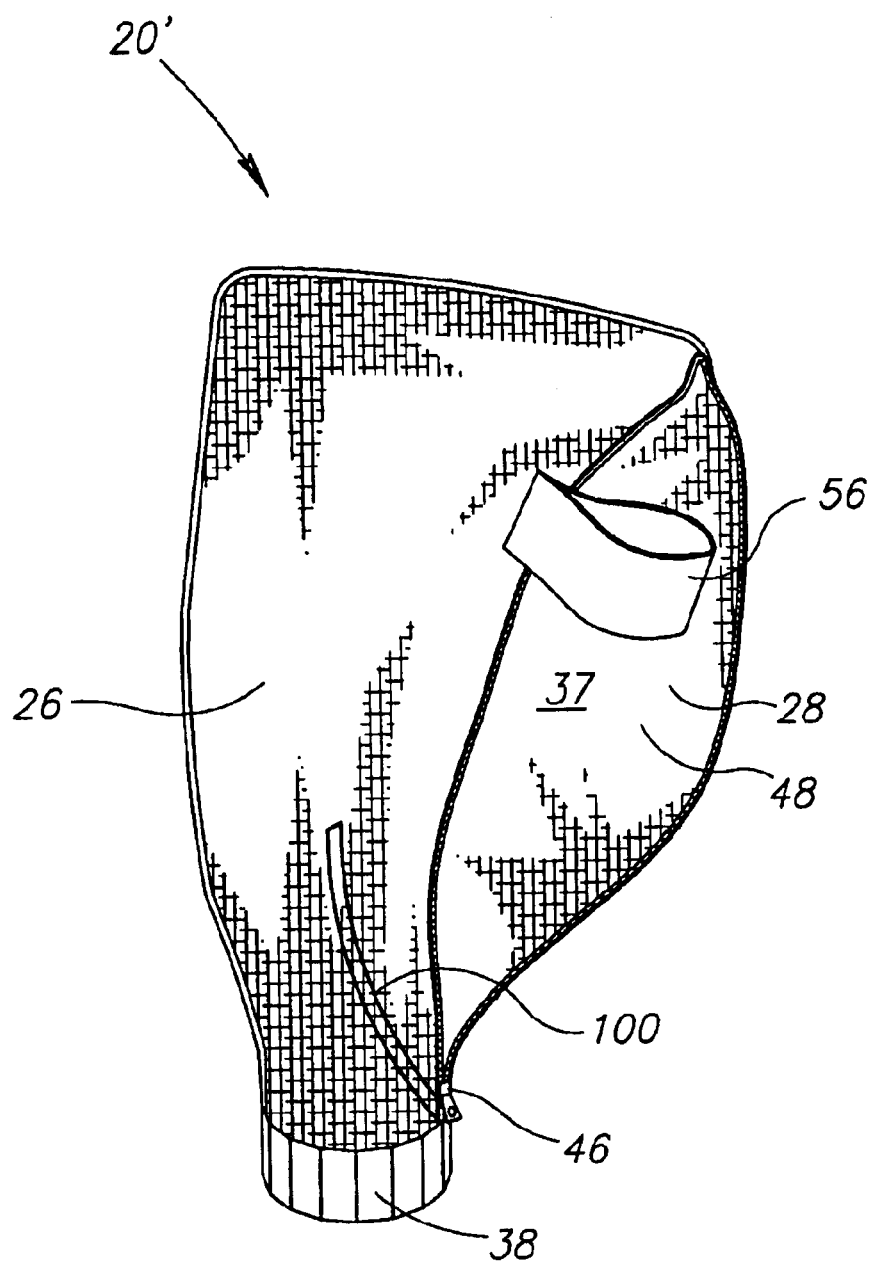
FIG. 6 is a perspective view of the bag of FIG. 4 with its discharge opening opened (in the open position).

FIGS. 4–6 detail an alternate embodiment 20' of the bag 20 detailed above. Here, components similar to those described above have the same numbering, with different components numbered differently and described below.

In this alternate embodiment bag 20', there is an internal seam 100, typically a strip sewn, affixed by adhesives or the like to join the sidewalls 26, 28. The seam 100 divides the chamber 37 into forward flow 102 and collection (rearward) 104 portions, in accordance with the bag of U.S. Pat. No. 4,618,420. The bag 20 also includes a strip 56, attached to it, that can be fastened around a hose of the cleaning machine, to hold and stabilize it.

There have been shown and described preferred embodiments of a filter bag. It is apparent to those skilled in the art, however, that many changes, variations, modifications, and other uses and applications for the filter bag and its components are possible, and also such changes, variations, modifications, and other uses and applications which do not depart from the spirit and scope of the invention are deemed to be covered by the invention, which is limited only by the claims which follow.

What is claimed is:

1. A pool cleaner filter bag comprising:
   (a) a plurality of sidewalls oriented with respect to each other to define a plurality of sides, said sides including a first open side defining an inlet opening configured for receiving an outlet stream from a pool cleaner suction mast, and a second side, and, to define at least a partially collapsible portion of said filter bag, said sidewalls including a material configured for allowing the passage of water therethrough; and,
   (b) at least one zipper mechanism along at least a portion of said second side, said zipper mechanism defining at least one discharge opening for said bag.

2. The filter bag of claim 1, wherein said portions of said second side, not including said one zipper mechanism, include said sidewalls being interconnected.

3. The filter bag of claim 2, additionally comprising: a third side wherein said sidewalls are interconnected.

4. The filter bag of claim 3, wherein said first side is intermediate said second side and said third side.

5. The filter bag of claim 4, additionally comprising: a fourth side, wherein said sidewalls are interconnected, and said fourth side is intermediate said second side and said third side.

6. The filter bag of claim 5, wherein said plurality of sidewalls includes two sidewalls.

7. The filter bag of claim 6, wherein said material is of a nylon mesh fabric.

8. The filter bag of claim 1, wherein said first side is received by a collar.

9. The filter bag of claim 8, wherein said collar is configured for receipt in a pool cleaning machine.

10. A pool cleaner filter bag comprising:
    (a) a plurality of sidewalls oriented with respect to each other to define a chamber therebetween and to define a plurality of sides, said sides including a first open side configured for communication with a pool cleaner suction mast, and a second side, and to define at least a partially collapsible portion of said filter bag, said sidewalls including material configured for allowing the passage of water therethrough;
    (b) at least one zipper mechanism located along at least a portion of said second side, such that said second side is releasably separable, said one zipper mechanism defining at least one discharge opening for said bag; and,
    (c) a seam extending along at least a portion of said sidewalls joining said plurality of sidewalls, said seam separating said chamber into a first water flow portion and a second material collection portion.

11. The filter bag of claim 10, wherein said portions of said second side, not including said one zipper mechanism, include said sidewalls being interconnected.

12. The filter bag of claim 11, additionally comprising: a third side wherein said sidewalls are interconnected.

13. The filter bag of claim 12, wherein said first side is intermediate said second side and said third side.

14. The filter bag of claim 13, additionally comprising: a fourth side, wherein said sidewalls are interconnected, and said fourth side is intermediate said second side and said third side.

15. The filter bag of claim 14, wherein said plurality of sidewalls includes two sidewalls.

16. The filter bag of claim 10, wherein said first side is received in a collar.

17. The filter bag of claim 16, wherein said collar is configured for receipt in a pool cleaning machine.

18. A pool cleaner filter bag comprising:
    a body including material configured for allowing the passage of water therethrough, said material configured such that at least a portion of said body is collapsible, said body including a first opening configured for receiving an outlet stream from a pool cleaner suction mast, and a second opening; and
    a zipper, moveable between open and closed positions, said zipper attached to at least a portion of said body to define said second opening in said body when said zipper is in an open position.

* * * * *